US012784250B2

(12) United States Patent

Xu et al.

(10) Patent No.: US 12,784,250 B2
(45) Date of Patent: Nov. 3, 2026

(54) SYSTEMS AND METHODS FOR ELIMINATING POSITION OFFSET DURING CAMERA DETECTION OF AN OBJECT DUE TO THE HEIGHT OF THE OBJECT

(71) Applicant: GM GLOBAL TECHNOLOGY OPERATIONS LLC, Detroit, MI (US)

(72) Inventors: An Xu, Shanghai (CN); Huan Lu, Shanghai (CN); Cherry Zhuang, Shanghai (CN)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 357 days.

(21) Appl. No.: 18/429,905

(22) Filed: Feb. 1, 2024

(65) Prior Publication Data

US 2025/0191209 A1 Jun. 12, 2025

(30) Foreign Application Priority Data

Dec. 11, 2023 (CN) ........................ 202311694266.6

(51) Int. Cl.

| | |
|---|---|
| ***G06T 7/60*** | (2017.01) |
| ***G01C 5/00*** | (2006.01) |
| ***G01C 21/00*** | (2006.01) |
| ***G01C 21/12*** | (2006.01) |
| ***G01C 21/30*** | (2006.01) |

(52) U.S. Cl.

CPC ................ *G06T 7/60* (2013.01); *G01C 21/12* (2013.01); *G06T 2207/20076* (2013.01); *G06T 2207/30241* (2013.01); *G06T 2207/30264* (2013.01)

(58) Field of Classification Search

CPC ............. G06T 7/60; G06T 2207/20076; G06T 2207/30241; G06T 2207/30264; G01C 21/12; G01C 21/30; G01C 21/005; G01C 5/00; G01C 11/00; G01C 21/1656

See application file for complete search history.

(56) References Cited

U.S. PATENT DOCUMENTS

| | | | | |
|---|---|---|---|---|
| 10,025,997 | B2 * | 7/2018 | Han | B62D 15/0285 |
| 11,079,764 | B2 * | 8/2021 | Nister | B60W 30/09 |
| 2018/0266828 | A1 * | 9/2018 | Best | G01C 21/1656 |

(Continued)

OTHER PUBLICATIONS

Stephan Nebiker, Jonas Meyer, Stefan Blaser, Manuela Ammann, and Severin Rhyner: "Outdoor Mobile Mapping and AI-Based 3D Object Detection with Low-Cost RGB-D Cameras: The Use Case of On-Street Parking Statistics"; Aug. 5, 2021; Remote Sensing; pp. 1-23. (Year: 2021).*

(Continued)

*Primary Examiner* — Siamak Harandi

(57) ABSTRACT

A vision system for a vehicle includes a camera system including one or more cameras. A dead reckoning system is configured to calculate a first trajectory of the vehicle from a first location to a second location. A vision-based positioning system is configured to calculate a second trajectory of an object located at a height above ground as the vehicle travels from the first location to the second location using a plurality of images generated by the camera system; calculate a plurality of height values for the object from the plurality of images; and identify and delete outliers in the plurality of height values.

20 Claims, 5 Drawing Sheets

(56) References Cited

U.S. PATENT DOCUMENTS

2022/0111868 A1* 4/2022 Costea .................. B60W 30/09

OTHER PUBLICATIONS

Wang, Yuqiong et al. "Improved VIDAR And Machine Learning-Based Road Obstacle Detection Method", Array, 2023, vol. 18, S. 100283, Feb. 2023.
Kaneko, A.M. et al. "Monocular Height Estimation By Chronological Correction Of Road Unevenness", 2016 IEEE, In: SICE International Symposium on System Integration (SII2016), Sapporo, Japan 2016.
Yi, Xu et al. "Fast Road Obstacle Detection Method Based On Maximally Stable External Regions", International Journal of Advanced Robotic Systems, 2018, vol. 15, Nr. 1, S. 1729881418759118.
Wikipedia, "Outlier Test According To Grubbs", May 12, 2021, URL: https://de.wikipedia.org/w/index.php?title-Ausrei%C3%9Fertest_nach_Grubbs&oldid=211884043.
German Office Action from counterpart DE1020241008156, dated Aug. 6, 2024.
Disclosed Anonymously. "Automated Parking System for Mechanical Stereo Spot" Questel Research Disclosure, Sep. 2021, Research Disclosure Journal; Database No. 689009; ISSN 0374-4353.

* cited by examiner

SYSTEMS AND METHODS FOR ELIMINATING POSITION OFFSET DURING CAMERA DETECTION OF AN OBJECT DUE TO THE HEIGHT OF THE OBJECT

CROSS-REFERENCE TO RELATED APPLICATIONS

This application claims the benefit of Chinese Patent Application No. 202311694266.6, filed on Dec. 11, 2023. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for eliminating position offset during camera detection of an object due to the height of the object off of the ground.

Vehicles may include one or more cameras that generate images that are used in conjunction with driver assistance systems such as parking assistance systems and/or autonomous driving systems. These systems identify objects in the images and determine positions of the objects relative to the moving vehicle. For example, vision-based object positioning performed by these systems assume that an object is located on the ground and the object position is inferred from the pixels of the ground point. If the object is located above ground, the position of the object may not be determined accurately.

SUMMARY

A vision system for a vehicle includes a camera system including one or more cameras. A dead reckoning system is configured to calculate a first trajectory of the vehicle from a first location to a second location. A vision-based positioning system is configured to calculate a second trajectory of an object located at a height above ground as the vehicle travels from the first location to the second location using a plurality of images generated by the camera system; calculate a plurality of height values for the object from the plurality of images; and identify and delete outliers in the plurality of height values.

In other features, the vision-based positioning system is further configured to calculate the height of the object based on remaining ones of the plurality of height values. The vision-based positioning system is further configured to correct coordinates of the object in response to the height. The object corresponds to a corner of a parking spot of a mechanical parking system. The vision-based positioning system is further configured to calculate a mean and a standard deviation of the plurality of height values.

In other features, the vision-based positioning system is further configured to calculate a score for each of the plurality of height values. The score is based on a difference between a selected one of the plurality of height values and the mean divided by the standard deviation. The score of the selected one of the plurality of height values is compared to at least one predetermined threshold and selectively deleted in response to the comparison.

In other features, coordinates of the object are corrected using a ratio of the height to a camera height.

A method for operating a vision system for a vehicle, comprises generating images using a camera system including one or more cameras; calculating a first trajectory of the vehicle from a first location to a second location using dead reckoning; calculating a second trajectory of an object located at a height above ground as the vehicle travels from the first location to the second location using a plurality of images generated by the camera system; calculating a plurality of height values for the object from the plurality of images; and identifying and deleting outliers in the plurality of height values.

In other features, the method includes calculating the height of the object based on remaining ones of the plurality of height values. The method includes correcting coordinates of the object in response to the height. The object corresponds to a corner of a parking spot of a mechanical parking system. The method includes calculating a mean and a standard deviation of the plurality of height values.

In other features, the method includes calculating a score for each of the plurality of height values. The score is based on a difference between a selected one of the plurality of height values and the mean divided by the standard deviation. The score of the selected one of the plurality of height values is compared to at least one predetermined threshold and selectively deleted in response to the comparison. The coordinates of the object are corrected using a ratio of the height to a camera height.

A vision system for a vehicle includes a camera system including one or more cameras. A dead reckoning system is configured to calculate a first trajectory of the vehicle from a first location to a second location. A vision-based positioning system is configured to calculate a second trajectory of an object located at a height above ground as the vehicle travels from the first location to the second location using a plurality of images generated by the camera system, and calculate a plurality of height values for the object from the plurality of images. The vision-based positioning system is configured to identify and delete outliers in the plurality of height values by calculating a mean and a standard deviation of the plurality of height values, calculating a score for each of the plurality of height values based on a difference between a selected one of the plurality of height values and the mean divided by the standard deviation, comparing the score to at least one predetermined threshold, and selectively deleting the selected one of the plurality of height values in response to the comparison. The vision-based positioning system is configured to calculate the height of the object based on remaining ones of the plurality of height values, and correct coordinates of the object in response to the height.

In other features, the object corresponds to a corner of a parking spot of a mechanical parking system. Coordinates of the object are corrected using a ratio of the height to a camera height.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Current vision-based object positioning systems include a camera system including one or more cameras that generate images that are combined to create a composite image such as a bird's eye view (BEV). The vision-based object positioning systems assume that an object in the image is located on the ground and a position of the object is determined relative to the vehicle based on pixels between the object and the vehicle. The vision system operates using two-dimensional coordinates and without height information (other than the known height H of the camera system relative to the ground). If the object is located above the ground, the position of the object cannot be inferred accurately using this approach. For example, vision-based object positioning systems incorrectly locate the position of corners of parking spots in mechanical parking systems.

The vision-based object positioning system according to the present disclosure calculates a trajectory difference between the object (e.g., based on multiple images from the vision system) and the vehicle (e.g., based on dead reckoning by an inertial measurement unit (IMU) and/or wheel speed from wheel speed sensors). The difference in the trajectories is used to calculate a height h of the object relative to ground. The height h of the object and the height H of the camera system are used to reduce the positioning error in the coordinates of the object.

Figure 1:
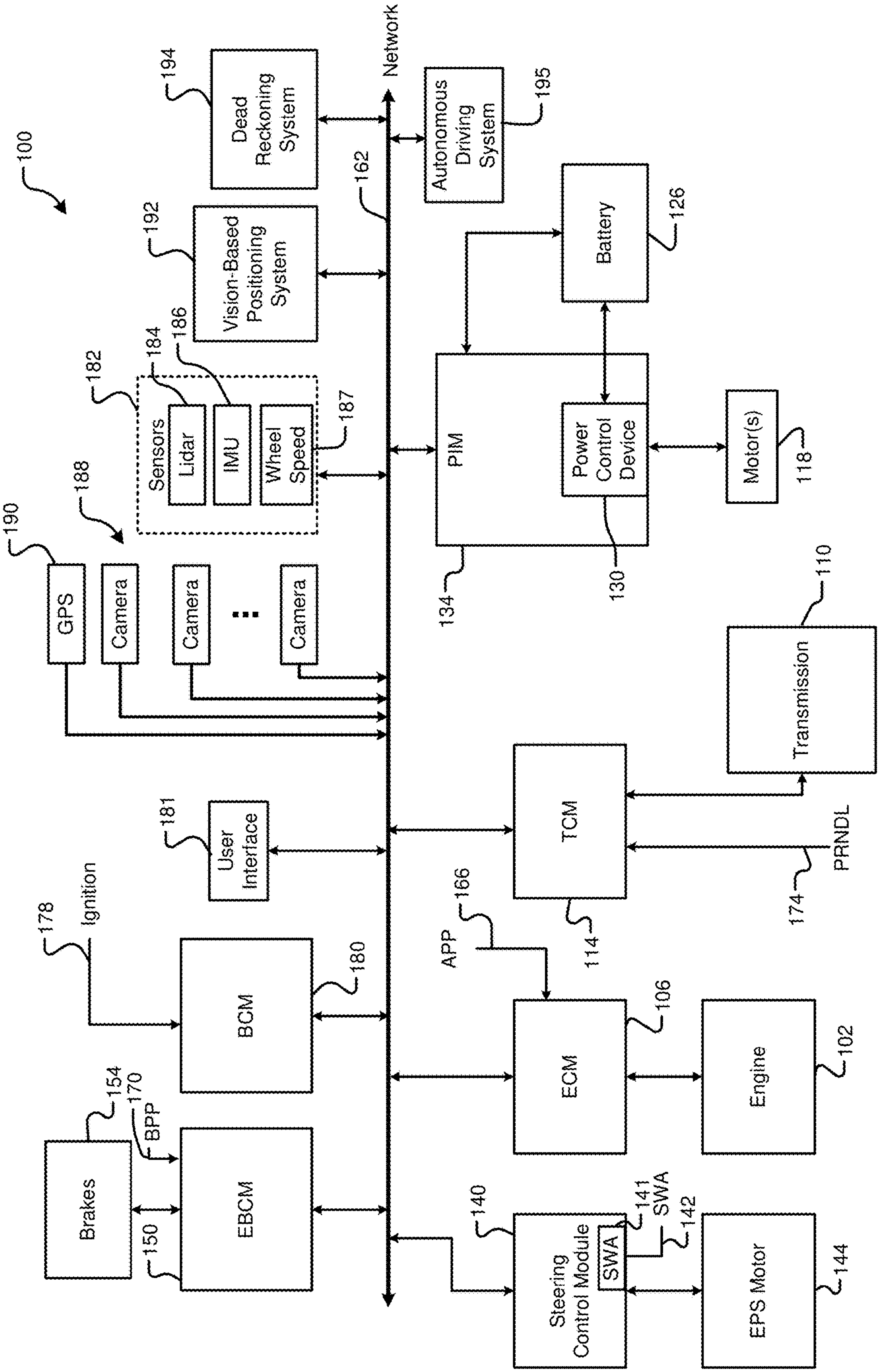
FIG. 1 is a functional block diagram of an example of a vehicle including a vision-based positioning system according to the present disclosure.

Referring now to FIG. 1, a functional block diagram of an example vehicle system is presented. While an example of a vehicle system for a hybrid vehicle is shown and described, the present disclosure is also applicable to other vehicles such as non-hybrid vehicles, electric vehicles, fuel cell vehicles, autonomous vehicles, and/or other types of vehicles.

The vehicle may include an engine 102 that combusts an air/fuel mixture to generate drive torque. An engine control module (ECM) 106 controls the engine 102 based on driver inputs and/or one or more other torque requests/commands from one or more vehicle control modules. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (such as pure electric vehicles), the engine 102 is omitted.

The engine 102 outputs torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors 118. In some examples, the electric motor 118 may be implemented within the transmission 110 and/or separately from the transmission 110. The electric motor 118 can act as either a motor or a generator. When acting as a generator, the electric motor converts mechanical energy into electrical energy. The electrical energy can be used to charge a battery 126 via a power control device (PCD) 130. When acting as a motor, the electric motor generates propulsion torque that may be used to drive the vehicle or supplement or replace torque output by the engine 102. While the example includes one electric motor, the vehicle may not include an electric motor or more than one electric motor.

In some examples, a power inverter control module (PIM) 134 may be used to control the electric motor 118 and the PCD 130. The PCD 130 applies power from the battery 126 to the electric motor 118 based on signals from the PIM 134, and the PCD 130 provides power output by the electric motor 118, for example, to the battery 126.

A steering control module 140 controls steering/turning of wheels of the vehicle, for example, based on the driver turning a steering wheel within the vehicle and/or steering commands from one or more vehicle control modules (e.g., such as the autonomous driving system). A steering wheel angle (SWA) sensor 141 monitors a rotational position of the steering wheel and generates a SWA signal 142 based on the position of the steering wheel. As an example, the steering control module 140 may control vehicle steering via an EPS motor 144 based on the SWA signal 142. An electronic brake control module (EBCM) 150 may selectively control brakes 154 of the vehicle based on the driver inputs and/or one or more other braking requests/commands from one or more vehicle control modules.

Control modules of the vehicle may share parameters via a network 162, such as a controller area network (CAN). The CAN may also be referred to as a car area network. For example, the network 162 may include one or more data buses. Various parameters may be made available by a given control module to other control modules via the network 162.

The driver inputs may include, for example, an accelerator pedal position (APP) 166 which may be provided to the ECM 106. A brake pedal position (BPP) 170 may be provided to the EBCM 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. For example, the ignition state 178 may be off, accessory, run, or crank.

The vehicle includes a user interface 181 such as a touch screen, buttons, knobs, etc. to allow an occupant to select or deselect driving modes such as AV and/or ADAS driving modes. The vehicle may include a plurality of sensors 182 (such as one or more lidar sensors 184, an inertial measurement unit (IMU) 186, one or more wheel speed sensors 187) and a camera system 188 including one or more cameras.

In some examples, the vehicle includes a global positioning system (GPS) 190 to determine a position and trajectory of the vehicle relative to streets and/or roadways. The vehicle further includes a vision-based positioning system 192 configured to combine images from the camera system and/or to identify objects in a field of view of the camera system 188. The vehicle further includes a dead reckoning system 194 configured to determine a trajectory of the vehicle in response to wheel speed from the IMU 186 and/or the wheel speed sensors 187 or other inputs. In some examples, an autonomous driving system 195 controls the acceleration, braking and/or steering of the vehicle with limited or no human intervention based on an output of the vision-based positioning system 192, the dead reckoning system 194, and/or the GPS 190.

Figure 2A:
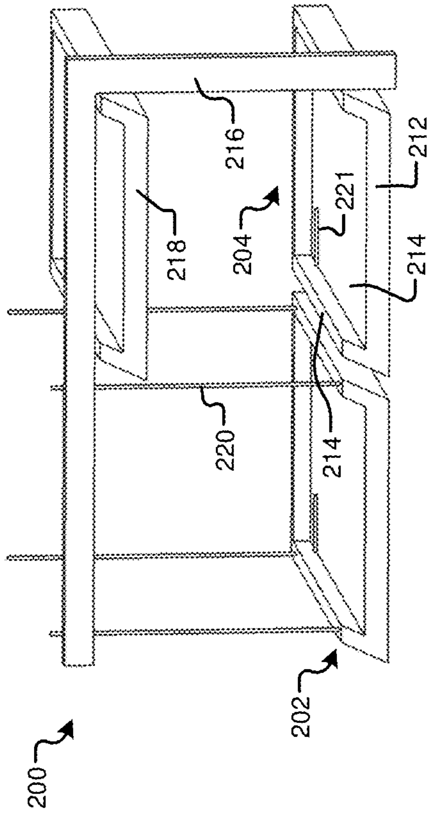
FIG. 2A is a perspective view of an example of a mechanical parking spot according to the present disclosure.

Referring now to FIG. 2A, a mechanical parking lot 200 includes parking spots 202 and 204. The parking spots 202 and 204 include a sloped surface 212, a parking surface 213, and side bars 214. The sloped surface 212 provides a transition from a floor (e.g., ground) of the parking location to the parking surface above the ground. One or more pillars 216 provide mechanical support. Chains 220 may be used to raise and/or lower a parking spot. A wheel stop 221 is arranged near a side of the parking spot opposite to the sloped surface 212. The mechanical parking lot allows cars to be stacked.

Figure 2B:
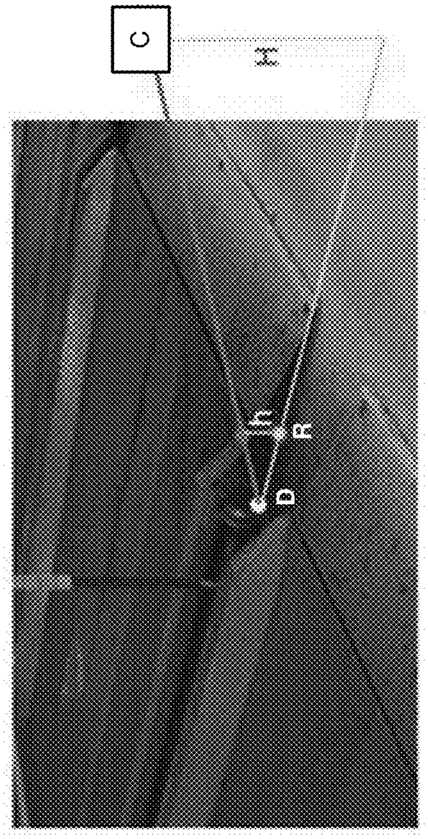
FIG. 2B is a perspective view of an example of a camera system viewing a parking spot corner according to the present disclosure.

Referring now to FIG. 2B, images generated by one or more cameras of the camera system are combined and used to determine a detected position of an object (e.g., a parking spot corner of a mechanical parking system) that is not on the ground. The BEV of the camera system 188 is located on the vehicle at a known height H relative to the ground upon which the vehicle is travelling. The vision-based positioning system presumes that the object is located on the ground and the object position is inferred from pixels of the ground point in the BEV. However, the presumption that the object is on the ground causes problems when the object is located above the ground. In other words, the position of the object is not inferred accurately. For example in FIG. 2B, the detected position D does not correspond to the real position R due to a height h of the object above the ground.

The perception system according to the present disclosure calculates a trajectory difference between the vision-based positioning system 192 (e.g., using multi-frame synthesis) and the dead reckoning system 194 using dead reckoning by inertial measurement unit (IMU) and/or a wheel speed from the wheel speed sensor 187. The vision-based positioning system 192 calculates the object height above the ground and then reduces the positioning error of the coordinates of the object.

Figure 3:
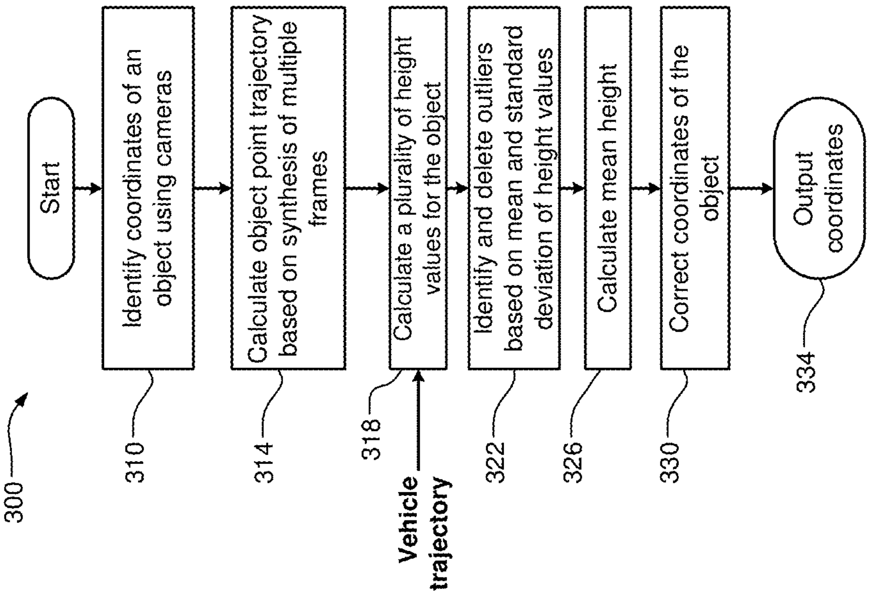
FIG. 3 is a flowchart of an example of a method for coordinates of an object according to the present disclosure.

Referring now to FIG. 3, a method 300 for eliminating position offset error during camera detection of an object due to the height of the object off of the ground is shown. At 310, the method identifies coordinates of the object (e.g., a parking spot corner) using one or more cameras. At 314, the method calculates an object point trajectory from point A' to B' using the BEV based on synthesis of multiple frames. At 318, the method calculates a plurality of height values for the object. At 322, the method identifies and deletes outlier values of the plurality of height values of the object based on relationship between each of the plurality of height values, a mean value of the height values, and a standard deviation of the plurality of height values. At 326, after deleting the outlier values (if any) in the plurality of height values, the method calculates a mean height h' of the remaining ones of the plurality of height values. At 330, the method corrects the coordinates of the object based on the mean height h'. At 334, the coordinates are output to the driver assistance module.

Figure 4:
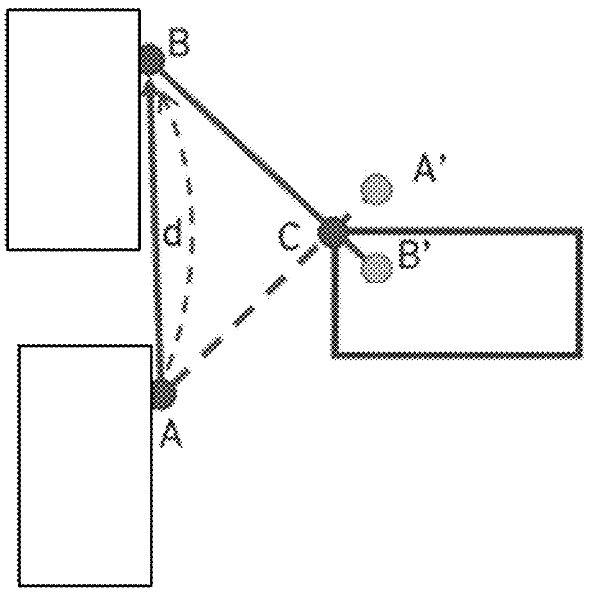
FIG. 4 illustrates an example of a method for calculating a vehicle trajectory according to the present disclosure.

Referring now to FIG. 4, a trajectory of the vehicle moving from point A to point B is shown as a dotted path. The trajectory of the vehicle is obtained using the IMU and/or wheel speed values from the wheel speed sensors. A distance d is calculated from point A to point B.

Figure 5:
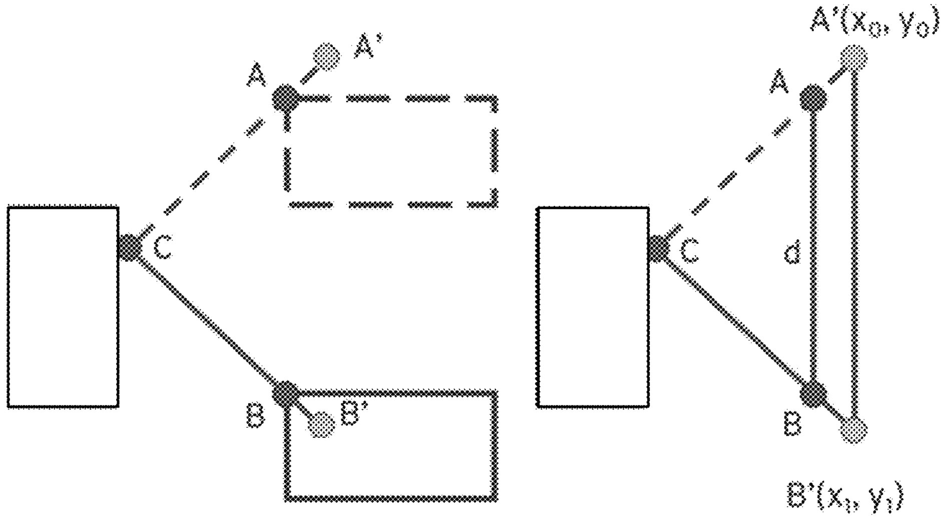
FIG. 5 illustrates an example of a method for calculating an object trajectory and a height of the object according to the present disclosure.

Referring now to FIG. 5, an object point trajectory (A'B') and a height h of an object (e.g., a corner of a parking plate) are determined. AB (or d) is the real moving distance of the object point (e.g., the spot plate). A'B' is the object point moving distance in birds eye view (BEV) from the camera. The height of the object (e.g., the spot plate) can be calculated as follows:

$$\frac{h}{H} = \frac{BB'}{CB'} = \frac{A'B' - AB}{AB} = \frac{A'B'}{AB} - 1;$$

$$h = \left(\frac{A'B'}{AB} - 1\right) * H; \text{ and}$$

$$h = \left(\frac{\sqrt{(x_1 - x_0)^2 + (y_1 - y_0)^2}}{d} - 1\right) * H.$$

Figure 6:
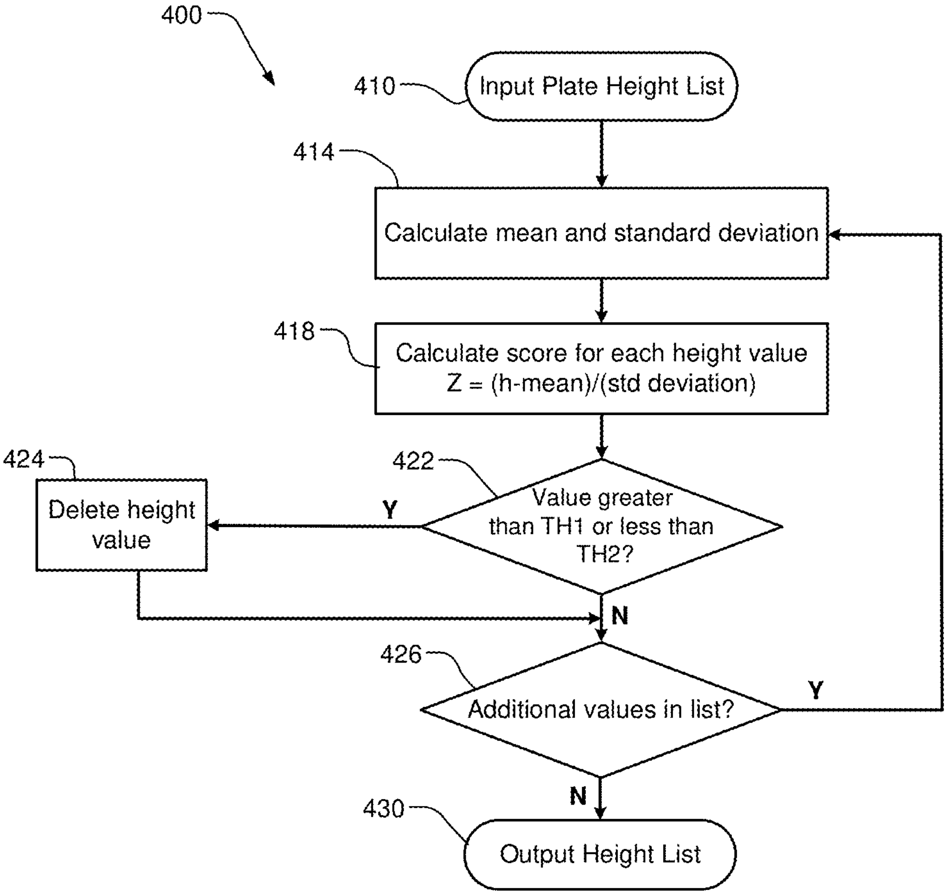
FIG. 6 is a flowchart of an example of illustrating identification and deletion of height values that are outliers according to the present disclosure.

Referring now to FIG. 6, a method 400 for identifying and deleting height outlier values is shown. At 410, a list of calculated plate heights h is received. At 414, mean and standard deviation are calculated for the list. At 418, a score Z is calculated for each height value based on Z=(h−mean)/(standard deviation) where the mean and standard deviation are based on the list of height values including outliers.

At 422, the method determines whether the score Z is greater than a first threshold TH1 or less than a second threshold TH2. In some examples, the first threshold TH1 is 3 and the second threshold TH2 is −3, although other threshold values can be used. If 422 is true, the method deletes the height value from the list at 424 and continues at 426. At 426, the method determines whether there are additional height values in the list. If 426 is true, the method returns to 414. If 426 is false, the list of the remaining plate height values is output at 426. The mean height h' is calculated.

Figure 7:
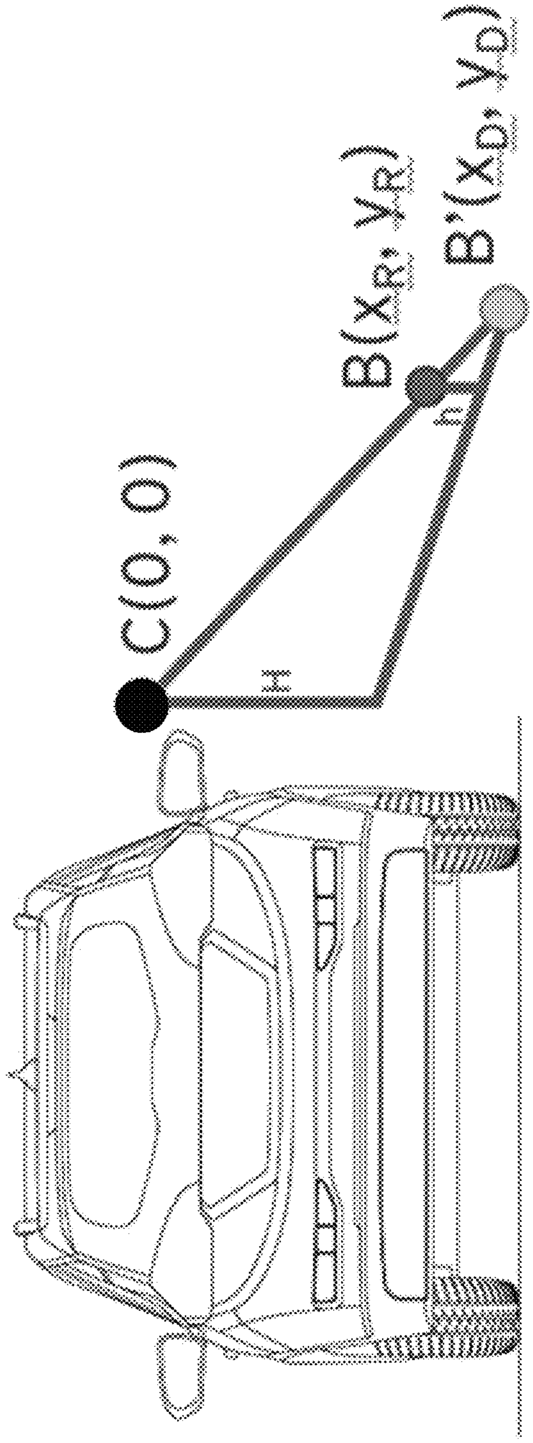
FIG. 7 illustrates an example of correction of coordinates of the object according to the present disclosure.

Referring now to FIG. 7, the coordinates of the object are corrected using the calculated height (e.g., the mean height h'). A coordinate B ($X_R$, $Y_R$) corresponds to the real coordinate of the object. A coordinate B ($X_D$, $Y_D$) corresponds to the detected coordinate of the object. The real coordinate B ($X_R$, $Y_R$) is calculated as follows:

$$B(X_R, Y_R) = B\left(X_D * \left(1 - \frac{h'}{H}\right), Y_D * \left(1 - \frac{h'}{H}\right)\right)$$

In some examples, the systems and methods according to the present disclosure improve positioning accuracy of the camera system from about 50 cm to under 5 cm for mechanical parking spot scenario in 3 m distance. The improvement in accuracy makes the automated parking feature feasible for mechanical parking spots and/or other applications.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vision system for a vehicle, comprising:
a camera system including one or more cameras;
a dead reckoning system configured to calculate a first trajectory of the vehicle from a first location to a second location; and
a vision-based positioning system configured to:
calculate a second trajectory of an object located at a height above ground as the vehicle travels from the first location to the second location using a plurality of images generated by the camera system;
calculate a plurality of height values for the object from the plurality of images; and
identify and delete outliers in the plurality of height values.

2. The vision system of claim 1, wherein the vision-based positioning system is further configured to calculate the height of the object based on remaining ones of the plurality of height values.

3. The vision system of claim 2, wherein the vision-based positioning system is further configured to correct coordinates of the object in response to the height.

4. The vision system of claim 1, wherein the object corresponds to a corner of a parking spot of a mechanical parking system.

5. The vision system of claim 2, wherein the vision-based positioning system is further configured to calculate a mean and a standard deviation of the plurality of height values.

6. The vision system of claim 5, wherein the vision-based positioning system is further configured to calculate a score for each of the plurality of height values.

7. The vision system of claim 6, wherein the score is based on a difference between a selected one of the plurality of height values and the mean divided by the standard deviation.

8. The vision system of claim 7, wherein the score of the selected one of the plurality of height values is compared to at least one predetermined threshold and selectively deleted in response to the comparison.

9. The vision system of claim 3, wherein coordinates of the object are corrected using a ratio of the height to a camera height.

10. A method for operating a vision system for a vehicle, comprising:
generating images using a camera system including one or more cameras;
calculating a first trajectory of the vehicle from a first location to a second location using dead reckoning;
calculating a second trajectory of an object located at a height above ground as the vehicle travels from the first location to the second location using a plurality of images generated by the camera system;
calculating a plurality of height values for the object from the plurality of images; and
identifying and deleting outliers in the plurality of height values.

11. The method of claim 10, further comprising calculating the height of the object based on remaining ones of the plurality of height values.

12. The method of claim 11, further comprising correcting coordinates of the object in response to the height.

13. The method of claim 12, further comprising calculating a mean and a standard deviation of the plurality of height values.

14. The method of claim 13, further comprising calculating a score for each of the plurality of height values.

15. The method of claim 14, wherein the score is based on a difference between a selected one of the plurality of height values and the mean divided by the standard deviation.

16. The method of claim 15, wherein the score of the selected one of the plurality of height values is compared to at least one predetermined threshold and selectively deleted in response to the comparison.

17. The method of claim 12, wherein the coordinates of the object are corrected using a ratio of the height to a camera height.

18. The method of claim 10, wherein the object corresponds to a corner of a parking spot of a mechanical parking system.

19. A vision system for a vehicle, comprising:
a camera system including one or more cameras;
a dead reckoning system configured to calculate a first trajectory of the vehicle from a first location to a second location; and
a vision-based positioning system configured to:
calculate a second trajectory of an object located at a height above ground as the vehicle travels from the first location to the second location using a plurality of images generated by the camera system;
calculate a plurality of height values for the object from the plurality of images;
identify and delete outliers in the plurality of height values by:
calculating a mean and a standard deviation of the plurality of height values;
calculating a score for each of the plurality of height values based on a difference between a selected one of the plurality of height values and the mean divided by the standard deviation;
comparing the score to at least one predetermined threshold; and
selectively deleting the selected one of the plurality of height values in response to the comparison;
calculating the height of the object based on remaining ones of the plurality of height values; and
correcting coordinates of the object in response to the height.

20. The vision system of claim 19, wherein:
the object corresponds to a corner of a parking spot of a mechanical parking system, and
coordinates of the object are corrected using a ratio of the height to a camera height.

* * * * *